United States Patent [19]

Pettersson

[11] Patent Number: 5,268,541
[45] Date of Patent: Dec. 7, 1993

[54] SOUND ATTENUATOR FOR LOW FREQUENCIES, IN PARTICULAR FOR AIR DUCTS IN PAPER MILLS

[75] Inventor: Henrik Pettersson, Mynämäki, Finland

[73] Assignee: Valmet Paper Machinery Inc., Finland

[21] Appl. No.: 820,160

[22] Filed: Jan. 13, 1992

[30] Foreign Application Priority Data

Jan. 17, 1991 [FI] Finland .................................. 910258

[51] Int. Cl.⁵ ............................................ E04F 17/04
[52] U.S. Cl. ...................................... 181/224; 181/243
[58] Field of Search ............... 181/224, 243, 252, 249, 181/256, 286, 287, 292, 293

[56] References Cited

U.S. PATENT DOCUMENTS

| | | | |
|---|---|---|---|
| 2,916,101 | 12/1957 | Naman | 181/224 |
| 2,994,401 | 8/1961 | Bourne et al. | 181/286 |
| 4,091,892 | 5/1978 | Hehmann et al. | 181/286 |
| 4,167,986 | 9/1979 | Conway | 181/224 |
| 4,236,597 | 12/1980 | Kiss et al. | 181/224 |
| 4,287,962 | 9/1981 | Ingard et al. | 181/224 |
| 4,787,473 | 11/1988 | Fuchs et al. | 181/224 |

FOREIGN PATENT DOCUMENTS

| | | |
|---|---|---|
| 361751 | 3/1981 | Australia . |
| 2801527 | 7/1979 | Fed. Rep. of Germany . |
| 631565 | 8/1982 | Switzerland . |
| 660928 | 5/1987 | Switzerland . |
| 8301082 | 3/1983 | World Int. Prop. O. . |

*Primary Examiner*—Michael L. Gellner
*Assistant Examiner*—Khanh Dang
*Attorney, Agent, or Firm*—Steinberg & Raskin

[57] ABSTRACT

The inventions concerns a sound attenuator for low frequencies for air-conditioning ducts, in particular for intake-air and/or exhaust-air ducts in paper mills. The sound attenuator comprises a frame whose flow duct substantially coincides with the air-conditioning duct and in which frame there is at least one plane attenuator member parallel to the flow direction and comprising one or several attenuator units operating by the Helmholtz and/or plate resonator principle. The attenuator member or members are fitted in the frame singly or as a group of several attenuator members to be replaced for cleaning and/or servicing of the sound attenuator and/or of the attenuator members.

17 Claims, 7 Drawing Sheets

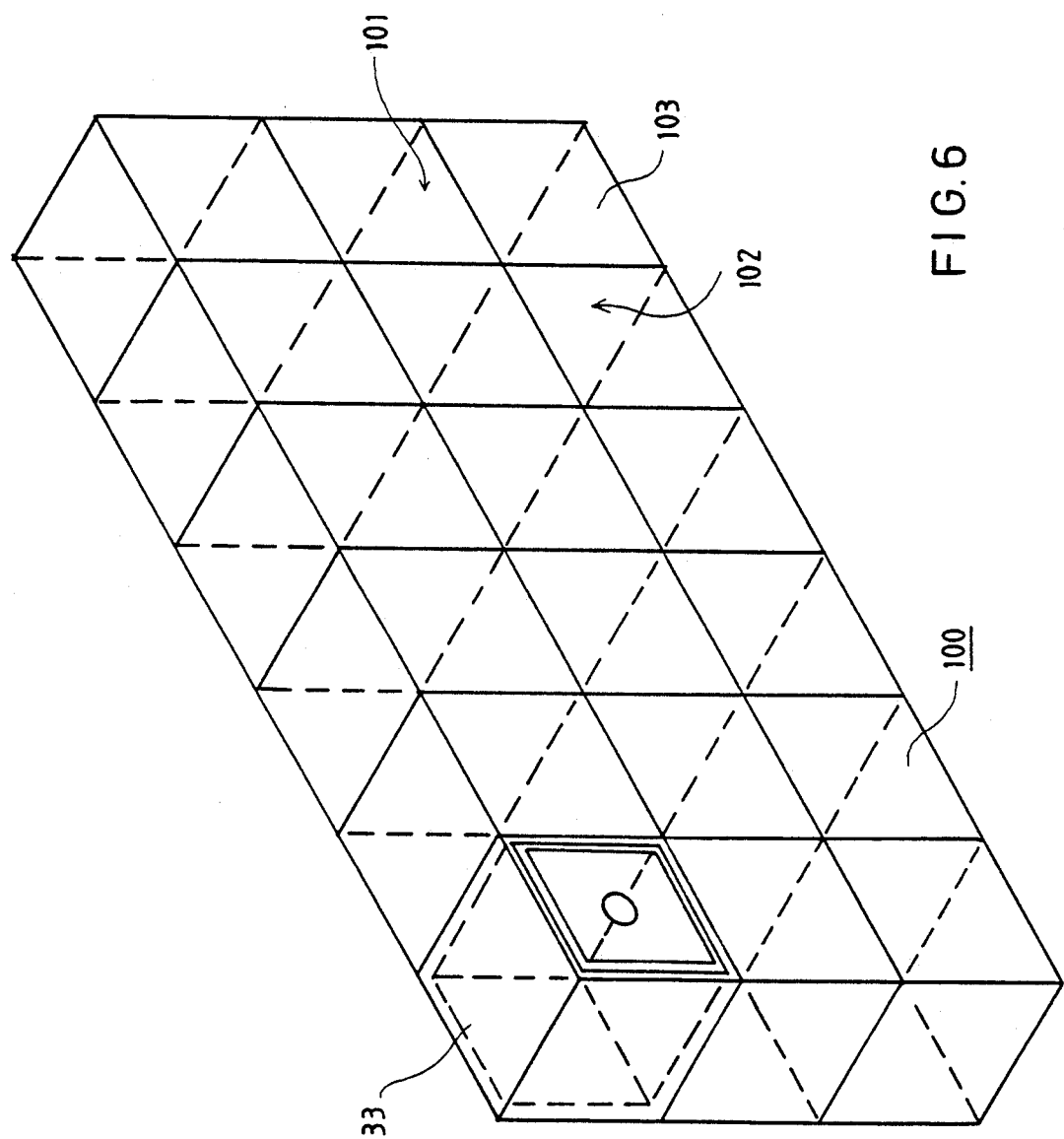

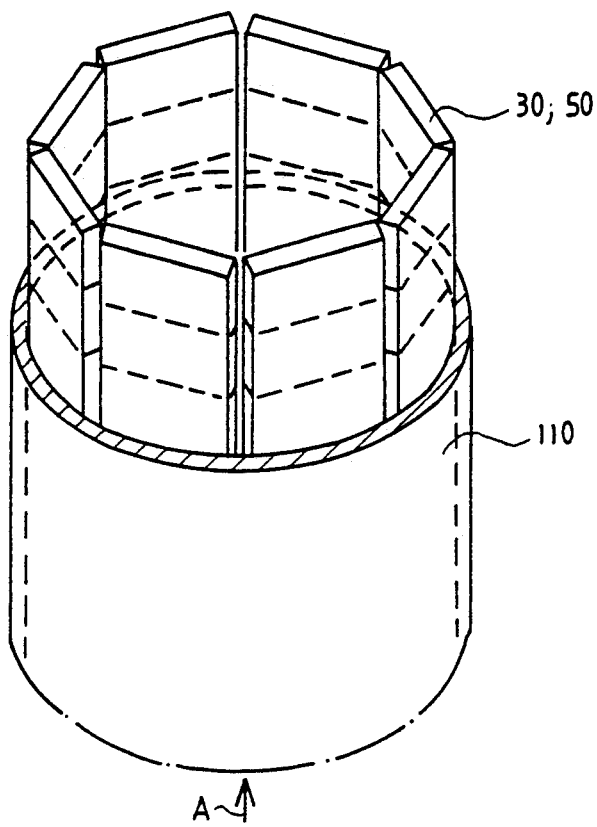
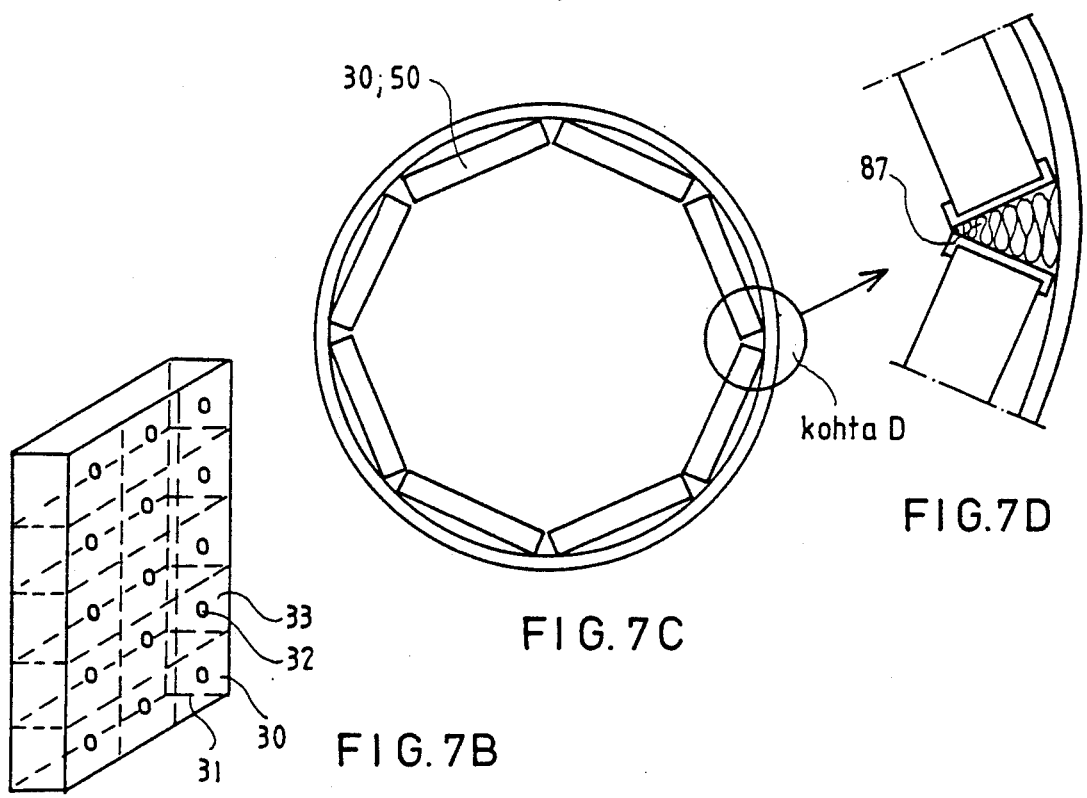
FIG.7A
FIG.7D
FIG.7C
FIG.7B

SOUND ATTENUATOR FOR LOW FREQUENCIES, IN PARTICULAR FOR AIR DUCTS IN PAPER MILLS

BACKGROUND OF THE INVENTION

The present invention concerns a sound attenuator for low frequencies for air-conditioning ducts, in particular for intake-air and/or exhaust-air ducts in paper mills.

Ever stricter requirements are imposed on suppression of noise in the environment. One important source of noise consists of the intake and exhaust air pipes for ventilation in connection with various industrial plants and other large buildings, through which pipes especially the noise of blowers is spread into the environment. The blowers are usually chosen on the basis of the quantity of air produced by them, and attention is frequently not paid to the noise produced by them. The noise produced by the blowers has quite a wide spectrum, which also imposes particular requirements on the noise suppression.

In view of suppression of noise, paper mills are particularly demanding, because the ventilation of the paper machine hall and in particular the elimination of moisture from the drying section of the paper machine require large quantities of air. It is a particular problem in the air-conditioning of a paper machine, e.g. with respect to the exhaust air from the wire part, that the exhaust air contains a large amount of moisture and a certain extent of fibers and various paper fillers, such as kaolin clay. Said materials tend to block the sound attenuators.

The prior-art sound attenuators in general, and the sound attenuators used in paper machine ventilation in particular, have been difficult to maintain, for they are often difficult to clean, and the replacement of their attenuator members is often difficult. As a consequence, sound attenuators which have been designed and dimensioned efficiently in of themselves operate unsatisfactorily, because they are "blocked" as a result of impurities.

Since the noise produced by blowers has quite a wide spectrum, in the intake and exhaust air ducts connected to the blowers, it is frequently necessary to used both absorptive and reactive sound attenuators. Absorptive sound attenuators operate primarily at higher frequencies; the maximum of their attenuation is at a frequency of about 1000 Hz, whereas reactive sound attenuators, which are mainly based on various resonator constructions, operate most efficiently at low frequencies, and their maximum attenuation is, as a rule, tuned in a range of about 100 to 200 Hz.

For sound attenuation at low frequencies, there are various principles, whose applications have been used and are used in sound attenuators, as is well known.

One well-known application in sound attenuation at low frequencies is the plate resonator, i.e. membrane attenuator, wherein the oscillation of the plate converts the sound energy to thermal energy. In a plate resonator, the plate or membrane that operates as the mass is placed at a certain distance from a rigid wall and closes the air space, which operates as a spring, behind it. In a plate resonator, the maximal attenuation occurs at a resonance frequency which depends on the mass of the plate and on the distance between the rigid wall and the plate that operates as the mass.

A second well-known solution for sound attenuation at low frequencies is the Helmholtz resonator, in which the resonator consists of an air space which communicates with the "outer air" through an opening. An air plug present in the opening forms the mass that resonates on support of the spring force formed by the air enclosed in the hollow space. The resonance frequency of a Helmholtz resonator depends on the area of the opening, on the volume of the air space, and on the length of the air plug formed in the opening. In a Helmholtz resonator, the frequency range and the extent of attenuation can be regulated by changing the dimensions of the chamber that operates as the air space and the size of the opening. When the volume of the air space becomes larger, the resonance frequency is shifted toward lower frequencies. When the area of the opening is made smaller, the resonance frequency is shifted towards lower frequencies.

With respect to prior art related to the present invention, reference is made to U.S. Pat. No. 4,787,473, in which a solution is suggested for attenuator members in which there are Helmholtz resonators at both sides. In the version described in said U.S. patent, attention has, however, not been paid to a possibility of cleansing or to ease of maintenance of the attenuator units, nor to designing the attenuator so that it is suitable for different purposes of use.

One important property of sound attenuators connected to the input or output ducts of blowers is, besides the attenuation of noise, the loss of pressure produced by them.

OBJECTS AND SUMMARY OF THE INVENTION

An object of the present invention is to provide novel solutions for the problems discussed above.

It is a particular object of the invention to provide a sound attenuator for low frequencies which is suitable for the air-conditioning of paper machines and which can be serviced and cleansed quickly and in which, when necessary, the attenuator members can be replaced, but whose construction is, nevertheless, relatively simple.

It is a further object of the invention to provide an easily serviceable sound attenuator for low frequencies which operates under demanding conditions, such as in wet, contaminating, hot, and/or dry environments.

In view of achieving the objectives stated above, those that will come out later, and others, the present invention is related to a sound attenuator for low frequencies comprising a frame whose flow duct substantially coincides with the air-conditioning duct and in which frame there is at least one plane attenuator member parallel to the flow direction and consisting of one or several attenuator units operating by the Helmholtz and/or plate resonator principle. The attenuator member or members are fitted in the frame singly or as a group of several attenuator members to be replaced for cleaning and/or servicing of the sound attenuator and/or of the attenuator members.

The sound attenuator in accordance with the invention is highly efficient at low frequencies, and the pressure losses occurring in same are very low, approximately equal to those occurring in a duct portion of the same length.

Further, the cleansing of a sound attenuator in accordance with the invention is easy, and it does not require any other maintenance operations.

When a solution in accordance with the invention is employed, the attenuators can be made as circular and rectangular attenuator members of standard sizes.

BRIEF DESCRIPTION OF THE DRAWINGS

The following drawings are illustrative of embodiments of the invention and are not meant to limit the scope of the invention as encompassed by the claims, wherein

FIG. 6 is a schematic illustration of an exemplifying embodiment of a sound attenuator for low frequencies in accordance with the invention which can be suspended on a wall, e.g.e, in a room for motor cooling fans; and FIGS. 7A to 7D are schematic illustrations of an exemplifying embodiment of a sound attenuator for low frequencies in accordance with the invention which can be cleansed after the attenuator has been removed from the system of ducts.

DETAILED DESCRIPTION

Figure 1:
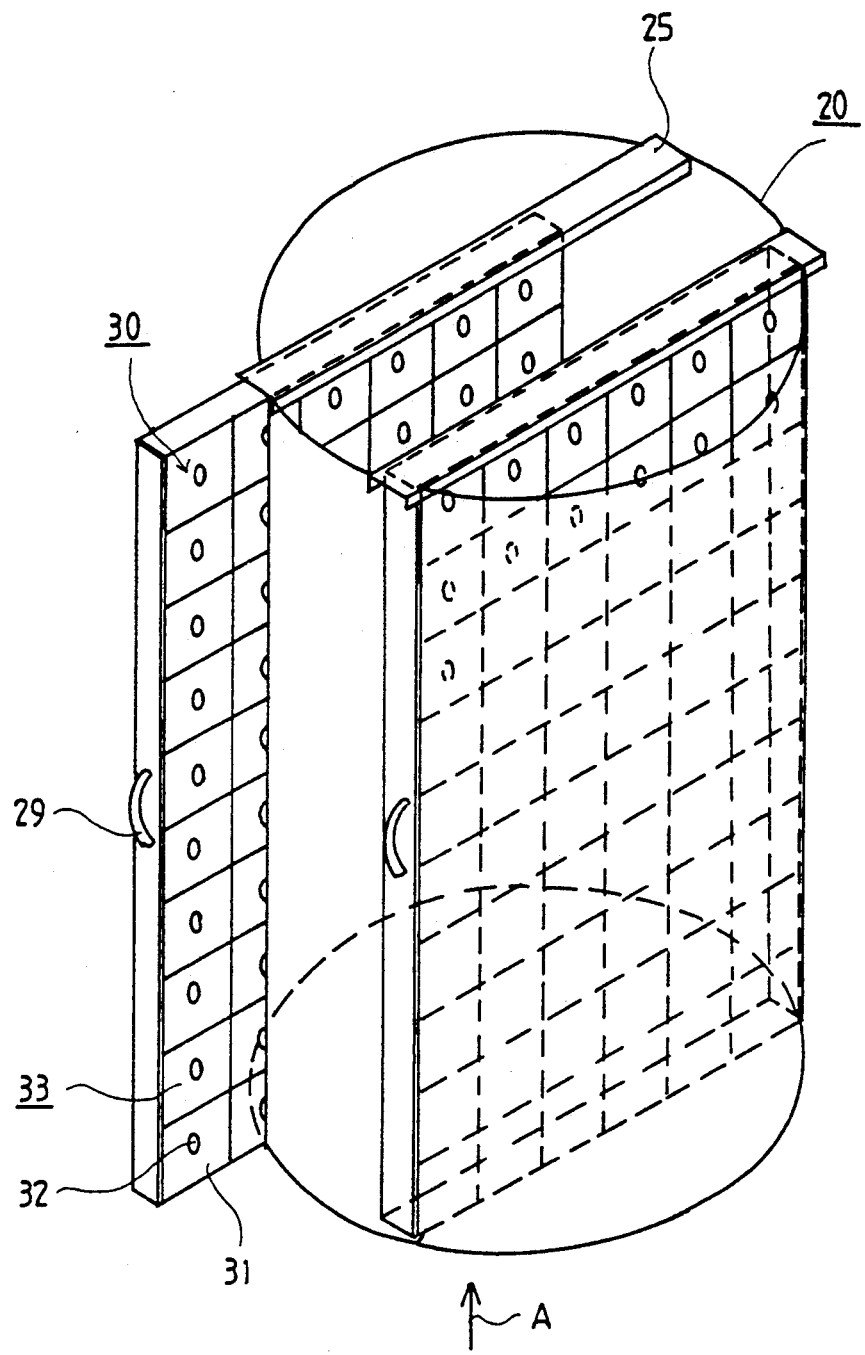
FIG. 1 is a schematic, axonometric view of a circular sound attenuator for low frequencies in accordance with the invention, which can be opened and cleansed on the site.

The embodiment of the invention shown in FIG. 1 comprises a sound attenuator for low frequencies which can be opened and cleansed on site and which has low pressure losses. The frame 20 forms a flow duct, which substantially coincides with the air-conditioning duct when the sound attenuator is placed in its position in the air-conditioning duct. The direction of air flow is denoted with the arrow A, and the plane attenuator member 30 placed inside the frame 20 is parallel to the flow A. The sectional shape of the frame 20 of the sound attenuator is circular in the direction perpendicular to the flow direction A, and the frame 20 is tubular. As the material of the frame 20, it is possible to use, e.g., aluminum, steel, etc. Standard flanges (not shown) can be attached to the frame 20. Attenuator members 30 are placed in the frame 20, which attenuation members may operate either by the Helmholtz principle or by the membrane principle and be either one-sided or two-sided. The attenuator members 30 are placed in the frame 20 so that their plane faces are substantially parallel to the direction A of the air flow.

In the embodiment shown in FIG. 1, Helmholtz attenuators are used. One to three attenuation members can be placed in the frame 20, depending on the size of the system of ducts. In the exemplifying embodiment shown in the figure, two members are used. For the material of the member 30, the same materials are suitable as for the material of the frame 20. An attenuator member 30 comprises a number of attenuator units 33, which consist of a closed volume 31 and of an opening 32. The size of the opening 32 and the chamber size of the closed volume 31 are determined by the attenuator size and by the frequency to be attenuated.

The attenuator members 30 are supported on the frame 20 by their top and bottom edges by means of horizontal rails 25. The attenuator members 30 can be removed from the frame 20 along the rails 25. To facilitate removal, the attenuator members 30 are provided with handles 29. The removable attenuator members 30 permit washing of the attenuator members 30 without making it necessary to remove the attenuator itself from the system of ducts. The members 30 can be replaced quickly by equivalent spare parts, and the contaminated attenuator members 30 can be washed later at a suitable time.

If plate resonator attenuators are used in the attenuator member 30, as the membrane material, it is possible to use, e.g., a thin metal sheet, plastic, teflon, or an equivalent material. No opening 32 is made into the membrane material. The membrane material is fixed to the face of the attenuator member, e.g., by means of thin rails and screws (not shown) or by welding. The membrane in the attenuator member may also be made of thin metal sheet which is provided with openings 32 and onto whose face a thin plastic film or any other synthetic film is glued as protection.

Figure 2:
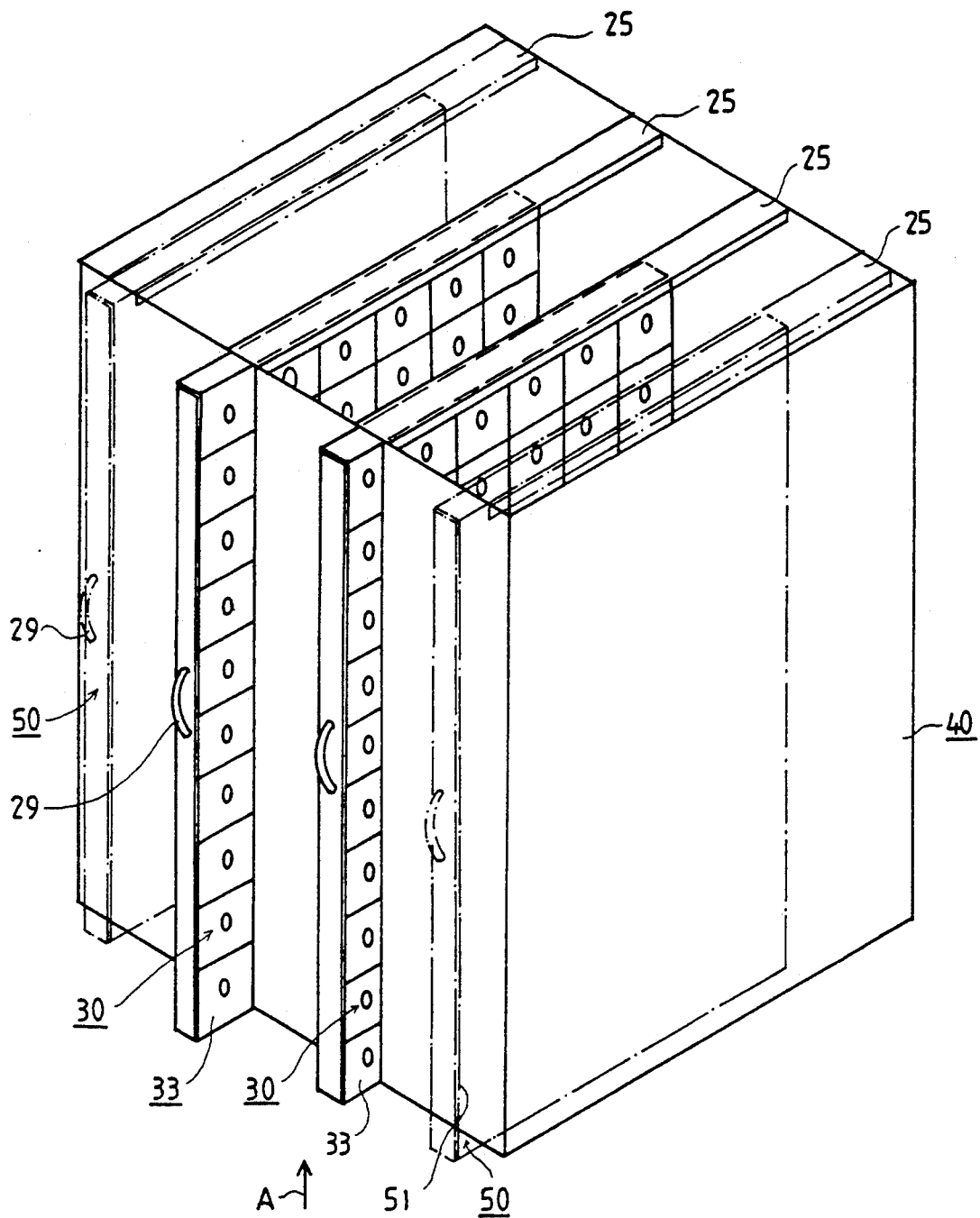
FIG. 2 is a schematic, axonometric view of an angular sound attenuator for low frequencies in accordance with the invention, which can be opened and cleansed on the site.

The exemplifying embodiment of the invention shown in FIG. 2 comprises an attenuator whose frame 40 is shaped as a rectangular prism. The frame 40 is placed in an air-conditioning duct so that its flow duct substantially coincides with the air-conditioning duct. The frame 40 has a rectangular section in the direction perpendicular to the flow direction A. The attenuator comprises two attenuator members 30 composed of Helmholtz or plate attenuators 33. At its outer edges, the attenuator may also comprises two attenuator members 50 operating by the Helmholtz or plate resonator principle. The attenuator members 30,50 are planar, and their plane faces are substantially parallel to the air flow direction A.

The attenuator members 30,50 are supported on horizontal rails 25 provided on the frame 40 by their top and bottom edges, along which rails the attenuator members 30,50 can be pulled by the handles 29 out of the frame 40. In the exemplifying embodiment shown in the figure, the attenuator members 30 placed in the middle are two-sided, and the attenuator members 50 placed at the outer sides are one-sided. The attenuator members placed at the outer sides may also be equal to those in the middle, or they may also be omitted.

Attenuator members can also be constructed inside the air intake openings of the system of ventilation ducts. The size and shape of the frame 20,40 are adapted to the size and shape of the system of ducts. If necessary, some of the attenuator members in an attenuator can also be constructed so that they operate by the principle of absorptive attenuation, i.e. so that they comprise, e.g., a perforated plate in whose interior there is foam plastic or wool.

Figure 3:
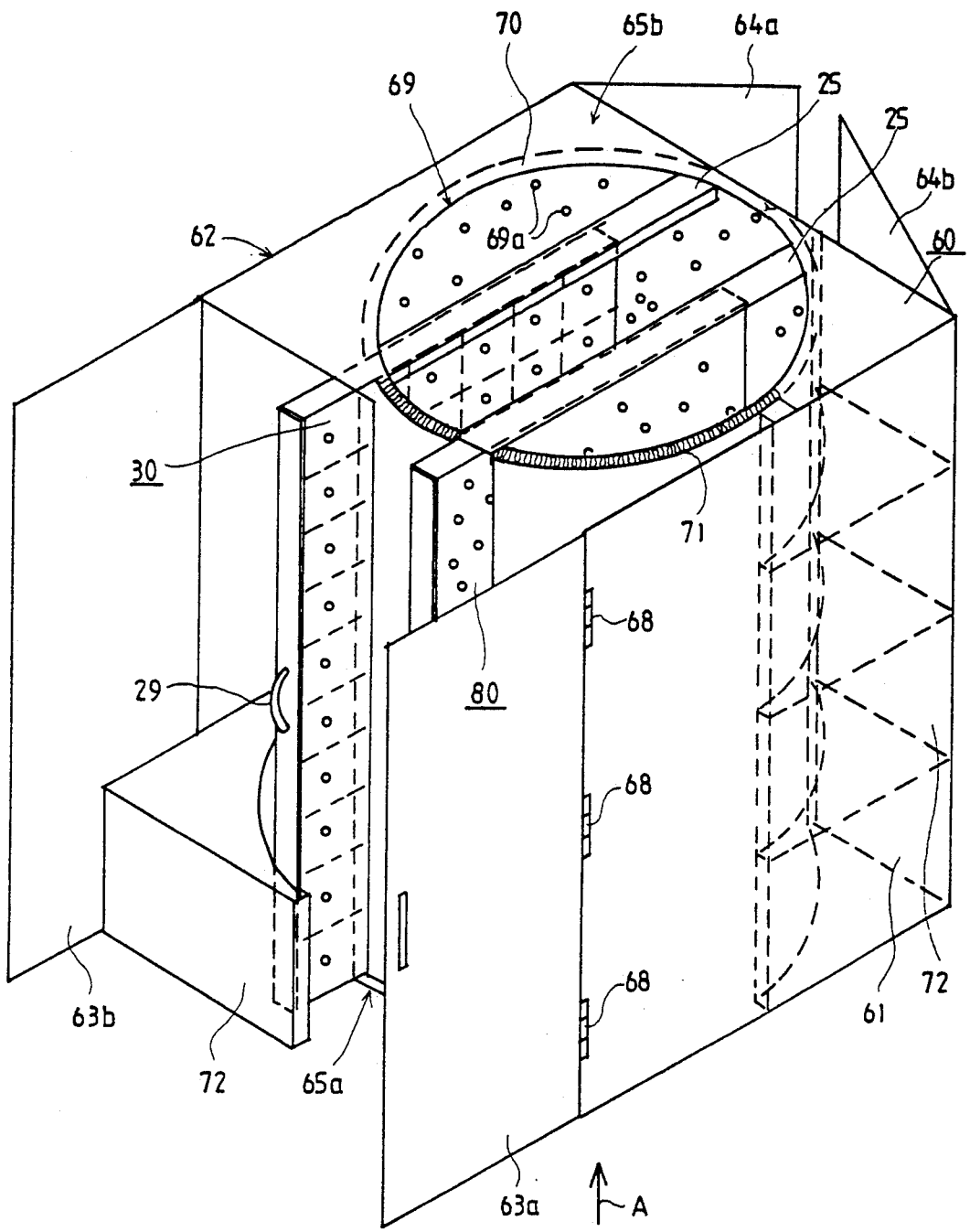
FIG. 3 is a schematic, axonometric view of a sound attenuator for low frequencies in accordance with the invention when applied to an absorptive attenuator.

In the exemplifying embodiment shown in FIG. 3, the sound attenuator comprises a box part 60 shaped as a rectangular prism, to whose frame construction opposite fixed vertical walls 61 and 62 have been attached. The other vertical walls consist of openable door pairs 63a,63b and 64a,64b provided with hinges 68. Through the box part 60, an inner tube 69 of circular section passes, which restricts the air duct and whose wall plate is provided with through perforations 69a and forms the frame 70. The inner tube 69 is fixed by means of its end wall 65a,65b. Around the perforated 69a inner tube 69 is fixed by means of its end walls 65a,65b. Around the perforated 69a inner tube 69 in the box part 60, a ring 71 of absorption material is fitted, which is, for example, made of mineral wool or foam plastic of permanent shape.

In the frame 70 of the sound attenuator, there are two attenuator members 30 and 80. The attenuator members 30,80 are planar and parallel to the flow A. The attenuator members 30 and 80 operate either by the Helmholtz principle or by the plate resonator principle. Also, the attenuator member 30 may operate by the Helmholtz or plate resonator principle and the attenuator member 80 by the absorption principle. By means of this combination, both high-frequency and low-frequency sound oscillations can be attenuated by means of the same attenuator.

The attenuator members 30,80 are supported on horizontal rails 25 fitted in the frame 70 by their top and bottom edges, along which rails 25 the attenuator members can be pulled out of the frame 20 by the handles either completely or partly. The space inside the box construction 60 that is placed outside the absorption ring 71 can be filled, e.g., with absorption pieces 72, which are arranged and dimensioned in such a way that they can be removed for cleansing and/or replacement through the opposite door pairs 63a,63b and 64a,64b fitted on the box 60.

Figure 4:
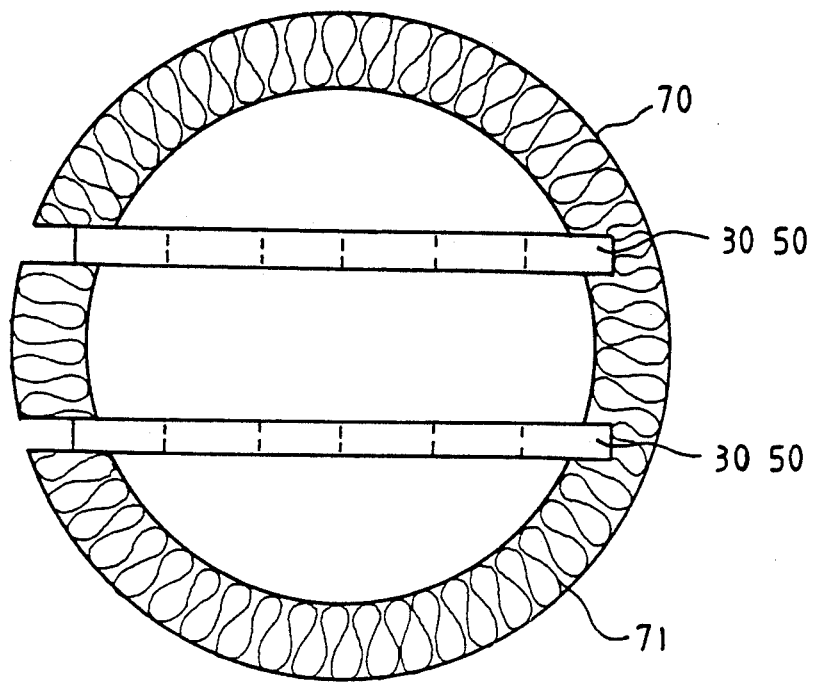
FIG. 4 is a schematic view of a sound attenuator for low frequencies in accordance with the invention when applied to an absorptive attenuator.

FIG. 4 shows an exemplifying embodiment in which Helmholtz/membrane attenuator members 30,50 are employed in an absorptive attenuator. The ring that is made of an absorption material and placed inside the frame 70 is denoted with the reference numeral 71. The absorption material may be wool, foam plastic, or some other, equivalent material. This absorption material is not replaceable and, being a construction of lower cost, is suitable for clean applications, for example as a sound attenuator for exhaust-air ducts in a machine hall. The thickness of the absorption material is, e.g., from about 100 to about 200 mm. The attenuator also includes plane attenuator members 30,50 which are parallel to the flow direction, which can be pulled out, and which operate either by the Helmholtz principle or by the membrane principle, depending on the requirements of the particular application. The number of members used in a pipe is 1 to 3, depending on the diameter of the pipe in the system of ducts.

Figure 5A:
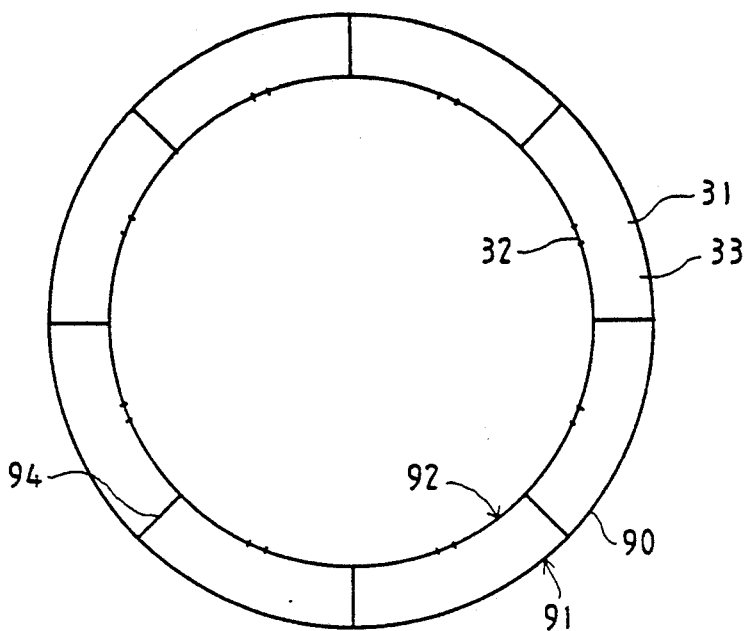
FIGS. 5A to 5C are schematic illustrations of a fixed sound attenuator for low frequencies in accordance with the invention wherein a Helmholtz sound attenuator is applied.
Figure 5B:
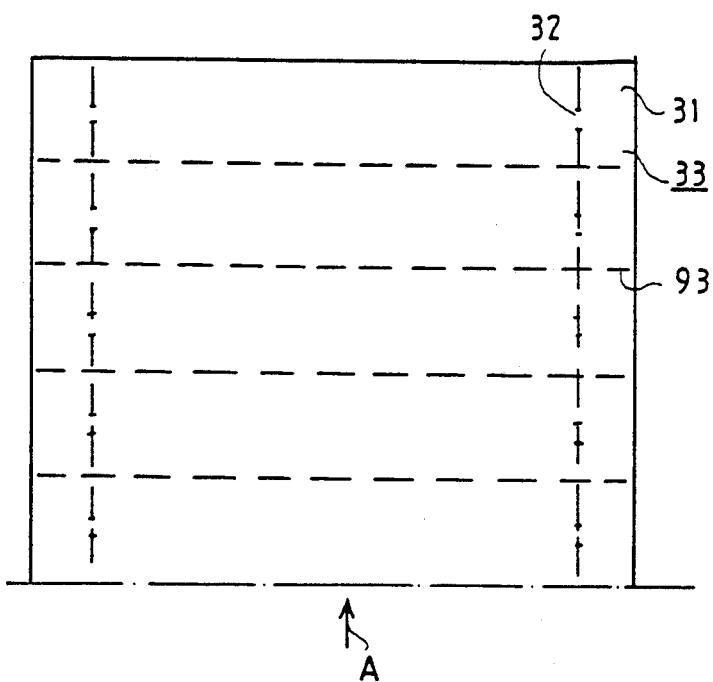
Figure 5C:
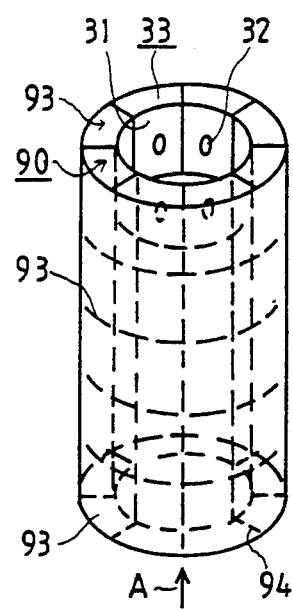

FIGS. 5A to 5C show an attenuator that has a fixed construction and operates by the Helmholtz principle and whose frame 30 consists of a material layer 91 of solid plate placed on the outside face and of a material layer 92 provided with openings 32 and placed on the inside face. As the material of the frame 90 of the attenuator, aluminum, aluminum zinc, steel, or stainless steel can be used. The thickness of the inner layer 92 may be, e.g., about 1 mm, and the thickness of the outer layer 91, e.g., from about 2 to about 3 mm.

The attenuator is comprised of attenuator units 33, in which the outer wall of the closed volume 31 consists of the outer wall 92 of the frame 90, said inner wall 92 and outer wall 91 being placed at a distance from one another. The horizontal walls 93 of the frame 90, which are placed at a distance from one another and extend from the inner wall 92 to the outer wall 91, form the bottom and top walls of the enclosed volume 31. Vertical walls 94 formed in the frame 90, which are placed at a distance from one another and extend from the inner wall 92 to the outer walls 91, form the side walls of the closed volume 31. Thus, each attenuator unit 33 comprises a closed volume 31, into which an opening 32 passes which has been formed into the inner wall 92 of the frame 90.

In the solution of attenuator shown in FIG. 6, the attenuator is constructed in a framework 100, which consists of horizontal walls 101 and vertical walls 102, which form a compartment 103, into which an attenuator member unit, for example a unit 33 operating by the Helmholtz principle, is fitted. Into the compartment 103, it is also possible to fit a plate resonator, i.e., an attenuator unit operating by the principle of membrane attenuation. The attenuator units 33 can be attached to the framework 100, e.g., by means of rapid connectors (not shown in the figure), in which case the attenuators can be opened quickly, for example, for cleansing and/or replacement. The embodiment shown in the figure is well suitable for use, e.g., as suspended on a wall, for attenuation of low frequencies, e.g. in motor cooling rooms, on a heat recovery plane, and at apparatuses placed on the ceiling.

In the exemplifying embodiment shown in FIGS. 7A to 7D, plane attenuator members 30,50 parallel to the flow direction A are placed in a circular frame 110 in octagonal shape, and the attenuator members 30,50 can be removed vertically. Such removal can, however, not be carried out on the site, but the whole attenuator must first be removed from the system of ducts. The attenuator members 30,50 are placed in the frame 110, e.g., in octagonal shape.

As is shown in FIG. 7D, which is an enlarged detail from FIG. 7C, the triangular space 87 that remains between the attenuator members 30,50 can be filled, e.g., with foam plastic. FIG. 7B shows an attenuator member 30, which operates, in the exemplifying embodiment shown in the figure, by the Helmholtz principle, i.e., the attenuator units 33 are provided with an opening 32 and with a closed volume 31. The attenuator members may also be an attenuator member 50 operating by the plate resonator principle, in which case it has no holes and it comprises a membrane/plate and an air space.

The sound attenuators in accordance with the invention are suitable for use in different applications of sound attenuation. In particular, all sound attenuators with circular shape are suitable for use in exhaust-air duct systems together with circular absorptive attenuators. In such a case, the overall length of the attenuators can be made shorter.

Suitable materials for the frame of a sound attenuator include metallic materials such as steel, SIS 2333 or SIS 2343, or different plastic materials, e.g. PTFE ("teflon"), PP (polypropylene), or some other, equivalent plastic material.

In plate resonator attenuators, suitable materials for the membrane are, e.g., the above steel materials (thickness, e.g., 0.2 mm), aluminum, fluorine plastic PTFE ("teflon"), polypropylene PP, or some other plastic material. Further, s the membrane, it is possible to use a thin perforated metal plate which is coated with an adhesive plastic film or some other synthetic film.

In Helmholtz attenuators, to prevent access of contaminates into the chamber, it is possible to use a thin "superlon" plastic layer on the faces of the attenuator members. A thin plastic material, such as polypropylene or teflon, can also be glued onto the face of the plate. In such a case, the attenuator operates by the membrane principle. The plastic material must be thin but, yet, thick enough to tolerate washing.

In tests carried out with an attenuator in accordance with the invention, attenuations of up to 30 decibels have been achieved at low frequencies. In said test, a membrane-based attenuator was concerned in which the membrane was an 0.3 mm thick teflon film with rib fastening.

The examples provided above are not meant to be exclusive. Many other variations of the present invention would be obvious to those skilled in the art, and are contemplated to be within the scope of the appended claims.

What is claimed is:

1. A sound attenuator for low frequencies for air-conditioning ducts, comprising
   a frame, said frame having a flow duct arranged such that it can substantially coincide with an air-conditioning duct, said frame further comprising at least one attenuator member having a top and bottom edge, and a planar face arranged such that it will be parallel to the flow direction of air when arranged in the air-conditioning duct, said at least one attenuator member comprising one or several attenuator units structured to operate by the Helmholtz and-/or plate resonator principle, said at least one attenuator member being located in said frame singly or as a group of several attenuator members,
   and means for removing said at least one attenuator member for cleaning and/or servicing of said sound attenuator, said means comprising horizontal rails, said at least one attentuator member being supported by said top and bottom edges on said horizontal rails and being arranged such that it is removable from said frame along said horizontal rails either completely or at least partly.

2. The sound attenuator of claim 1, wherein said frame has a substantially circular sectional shape, such that when said frame is arranged in the air-conditioning duct, said circular section is arranged in a direction perpendicular to the flow direction of air in said air-conditioning duct.

3. The sound attenuator of claim 1, wherein said frame has a substantially rectangular sectional shape, such that when said frame is arranged in the air-conditioning duct, said rectangular section is arranged in a direction perpendicular to the flow direction of air in said air-conditioning duct.

4. The sound attenuator of claim 1, comprising a plurality of attenuator members, wherein said frame has a substantially polygonal shape, such that when said frame is arranged in the air-conditioning duct, said polygon section is arranged in a direction perpendicular to the flow direction of air in said air-conditioning duct, said attenuator members being fitted in said frame substantially in the shape of a polygon that the principal shape of the polygon consisting of the attenuator members coincides with the sectional shape of said frame in a direction perpendicular to the flow direction fo air in said air-conditioning duct.

5. The sound attenuator of claim 1, comprising a plurality of attenuator members, wherein at least one of said attenuator members comprises a structure based on absorptive sound attenuation.

6. The sound attenuator of claim 1 which is arranged in an intake-air and/or exhaust duct in a paper mill.

7. The sound attenuator of claim 1, wherein at least one of said attenuator units is structured based on absorptive sound attenuation.

8. An arrangement for providing sound attenuation in an air duct, comprising
   a sound attenuator having a flow duct, said sound attenuator having
   a frame arranged in said air duct such that flow of air through said flow duct substantially coincides with flow of air through said air duct,
   an attenuator member arranged in said frame, said attenuator member having a top and bottom edge, and a planar face arranged such that it will be parallel to the flow direction of air in said flow duct, said attenuator member comprising one or several attenuator units structured to operate by the Helmholtz and/or plate resonator principle, and
   means for removing said at least one attenuator member for cleaning and/or servicing of said sound attenuator, said means comprising horizontal rails, said attenuator member being supported by said top and bottom edges on said horizontal rails and being arranged such that is ti removable from said frame along said horizontal rails either completely or at least partly.

9. The arrangement of claim 8, further comprising a second attenuator member arranged in said frame, said second attenuator member having a planar face arranged such that it will be parallel to the flow direction of air in said flow duct, said second attenuator member being structured based on absorptive sound attenuation.

10. The arrangement of claim 8, wherein said frame further comprises an outer wall, an inner wall located at a distance from said outer wall, and an absorption material located between said inner and outer walls for absorptive attention.

11. The arrangement of claim 8, wherein said frame has a substantially circular sectional shape arranged in a direction perpendicular to the flow direction of air in said air-conditioning duct.

12. The arrangement of claim 8, wherein said frame has a substantially rectangular sectional shape arranged in a direction perpendicular to the flow direction of air in said air-conditioning duct.

13. The arrangement of claim 8, comprising a plurality of attenuator members, wherein said frame has a substantially polygonal shape arranged in a direction perpendicular to the flow direction of air in said air-conditioning duct, said attenuator members being fitted in said frame substantially in the shape of a polygon so that the principal shape of the polygon consisting of the attenuator members coincides with the sectional shape of said frame.

14. The sound attenuator of claim 1, wherein said means comprises a handle attached to an end of said at least one attenuating member.

15. The sound attenuator of claim 5, wherein said plurality of attenuator members are placed into the sound attenuator.

16. The sound attentuator of claim 1, wherein said means are integrally connected to said frame.

17. The sound attentuator of claim 8, wherein said means are integrally connected to said frame.

* * * * *